(12) United States Patent
Lee et al.

(10) Patent No.: US 10,166,482 B2
(45) Date of Patent: *Jan. 1, 2019

(54) METHOD OF OPERATING SCREEN BASEBALL SYSTEM

(71) Applicant: REALYAGU ZONE CO., LTD., Seoul (KR)

(72) Inventors: Seung-Jin Lee, Seoul (KR); Han-Jo Kwon, Seoul (KR); Hyoung-Gon Kim, Seoul (KR)

(73) Assignee: REALYAGU ZONE CO., LTD., Seoul (KR)

( * ) Notice: Subject to any disclaimer, the term of this patent is extended or adjusted under 35 U.S.C. 154(b) by 139 days.

This patent is subject to a terminal disclaimer.

(21) Appl. No.: 15/080,022

(22) Filed: Mar. 24, 2016

(65) Prior Publication Data

US 2016/0279526 A1  Sep. 29, 2016

(30) Foreign Application Priority Data

Mar. 25, 2015  (KR) .................... 10-2015-0041844

(51) Int. Cl.
*A63B 69/00*  (2006.01)
*A63F 13/812*  (2014.01)
(Continued)

(52) U.S. Cl.
CPC ........ *A63F 13/812* (2014.09); *A63B 69/0002* (2013.01); *A63B 69/40* (2013.01);
(Continued)

(58) Field of Classification Search
CPC ...... A63F 13/00; A63F 13/213; A63F 13/248; A63F 13/65; A63F 13/812; A63F 13/428;
(Continued)

(56) References Cited

U.S. PATENT DOCUMENTS

| 4,442,823 A | 4/1984 | Floyd |
| 4,915,384 A | 4/1990 | Bear |

(Continued)

FOREIGN PATENT DOCUMENTS

| JP | 10500592 A | * | 1/1998 |
| JP | 10500592 A | | 1/1998 |

(Continued)

OTHER PUBLICATIONS

Japanese Office Action dated Jul. 12, 2016; Application No. JP2016-061645.

(Continued)

*Primary Examiner* — William H McCulloch, Jr.
*Assistant Examiner* — Chase Leichliter
(74) *Attorney, Agent, or Firm* — Heslin Rothenberg Farley & Mesiti P.C.; George S. Blasiak

(57) ABSTRACT

A method of operating a screen baseball system includes registering a personal rank of a user by a game management unit, displaying a pitching motion on a screen and starting a pitching action according to a selected pitch type, performing a simulation along a trajectory of a batted ball converted from batting detection data of a batter among users, and displaying an image on the screen by the game management unit, photographing a batting image of the batter and storing the batting image in a database by a game photographing unit such that the batting image is utilized for user training and character development programs, and transmitting simulation information and batting image data displayed, to a game shop, in which another user is positioned, in real time by a game server to play a game on line if the another user is positioned in a remote place.

16 Claims, 4 Drawing Sheets

(51) Int. Cl.
*A63F 13/213* (2014.01)
*A63B 69/40* (2006.01)
*A63F 13/573* (2014.01)
*A63F 13/798* (2014.01)
*A63F 13/65* (2014.01)
*A63F 13/428* (2014.01)

(52) U.S. Cl.
CPC .......... *A63F 13/213* (2014.09); *A63F 13/573* (2014.09); *A63F 13/798* (2014.09); *A63F 13/428* (2014.09); *A63F 13/65* (2014.09)

(58) Field of Classification Search
CPC ................ A63B 69/00; A63B 69/0002; A63B 2069/0008; A63B 71/00; A63B 71/0619; A63B 24/00; A63B 24/0021
USPC .......... 463/421, 422, 450–453; 473/421, 422, 473/450–453
See application file for complete search history.

(56) References Cited

U.S. PATENT DOCUMENTS

| | | | | |
|---|---|---|---|---|
| 4,941,662 | A * | 7/1990 | DePerna | A63C 19/00 |
| | | | | 273/317.6 |
| 4,995,607 | A * | 2/1991 | Whitfield | A63B 24/0021 |
| | | | | 473/454 |
| 5,195,744 | A | 3/1993 | Kapp | |
| 5,401,018 | A * | 3/1995 | Kelly | A63B 63/00 |
| | | | | 473/140 |
| 5,443,260 | A * | 8/1995 | Stewart | A63B 69/0002 |
| | | | | 473/421 |
| 5,868,578 | A | 2/1999 | Baum | |
| 6,082,350 | A * | 7/2000 | Crews | A63B 47/00 |
| | | | | 124/78 |
| 6,182,649 | B1 * | 2/2001 | Battersby | A63B 69/406 |
| | | | | 124/78 |
| 6,186,133 | B1 | 2/2001 | Battersby | |
| 6,186,134 | B1 | 2/2001 | Battersby | |
| 2001/0006063 | A1 | 7/2001 | Battersby | |
| 2001/0006064 | A1 | 7/2001 | Battersby | |
| 2001/0008755 | A1 | 7/2001 | Battersby | |
| 2001/0018912 | A1 | 9/2001 | Battersby | |
| 2001/0056000 | A1 * | 12/2001 | Hori | A63B 63/00 |
| | | | | 473/453 |
| 2003/0004017 | A1 | 1/2003 | Battersby | |
| 2003/0040381 | A1 * | 2/2003 | Richings | A63B 47/00 |
| | | | | 473/415 |
| 2004/0088120 | A1 * | 5/2004 | Kelly | A63B 24/0021 |
| | | | | 702/41 |
| 2006/0287137 | A1 * | 12/2006 | Chu | A63B 47/025 |
| | | | | 473/422 |
| 2008/0300071 | A1 * | 12/2008 | Valaika | A63B 69/0002 |
| | | | | 473/422 |
| 2009/0029754 | A1 * | 1/2009 | Slocum | A63B 24/0087 |
| | | | | 463/5 |
| 2013/0218308 | A1 * | 8/2013 | Altshuler | G06F 19/00 |
| | | | | 700/91 |
| 2013/0296079 | A1 * | 11/2013 | Schwartz | A63B 69/40 |
| | | | | 473/431 |
| 2015/0104115 | A1 * | 4/2015 | Jin | H04N 21/4316 |
| | | | | 382/296 |
| 2015/0350737 | A1 * | 12/2015 | Anderson | H04N 21/47205 |
| | | | | 348/564 |
| 2016/0279496 | A1 | 9/2016 | Lee | |

FOREIGN PATENT DOCUMENTS

| | | |
|---|---|---|
| JP | 2001208764 A | 8/2001 |
| JP | 2005204947 A | 8/2005 |
| JP | 2005253871 A | 9/2005 |
| JP | 2006197998 A * | 8/2006 |
| JP | 2009028455 A | 2/2009 |
| JP | 2012040071 A | 3/2012 |
| KR | 20010008367 A | 2/2001 |
| KR | 20010026429 A | 4/2001 |
| KR | 20070110544 A | 11/2001 |
| KR | 201300252778 A | 3/2013 |
| WO | WO2005120659 | 12/2005 |
| WO | WO2011083546 | 7/2011 |
| WO | WO2013057814 | 4/2013 |

OTHER PUBLICATIONS

Japanese Notice of Allowance dated Jun. 28, 2016 for Application No. 2016-061607.
Non-Final Office Action for U.S. Appl. No. 15/080,086, filed Mar. 24, 2016, dated Oct. 18, 2017.
Applicant's Response to Non-Final Office Action for U.S. Appl. No. 15/080,086, filed Mar. 24, 2016, dated Jan. 18, 2018.
Applicant's Communication to Record Substance of Interview for U.S. Appl. No. 15/080,086, filed Mar. 24, 2016, dated May 11, 2018.
Applicant's eTerminal Disclaimer for U.S. Appl. No. 15/080,086, filed Mar. 24, 2016, dated May 11, 2018.
Notice of Allowance for U.S. Appl. No. 15/080,086, filed Mar. 24, 2016, dated May 17, 2018.

* cited by examiner

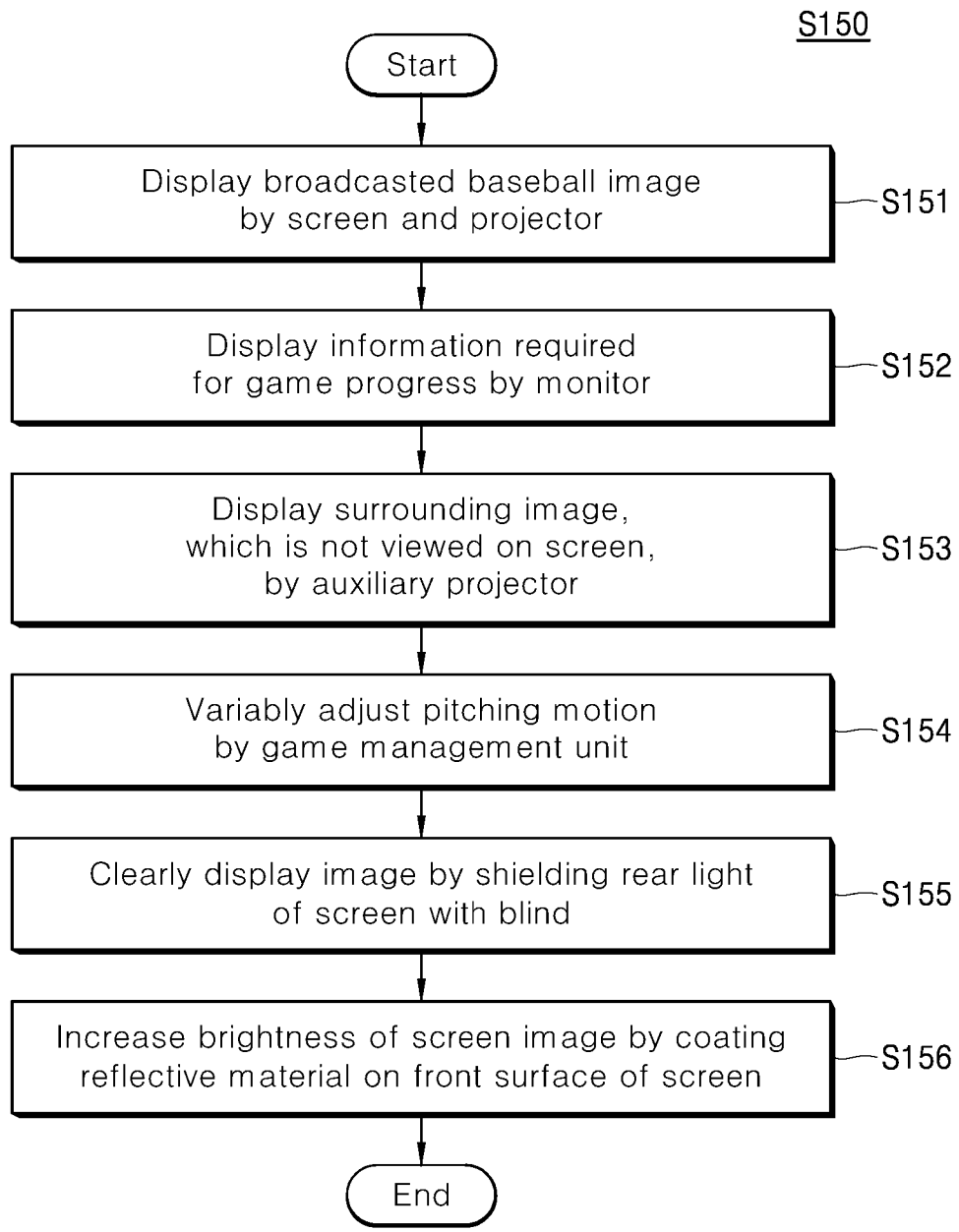

METHOD OF OPERATING SCREEN BASEBALL SYSTEM

CROSS-REFERENCE TO RELATED APPLICATION

This application claims priority to Korean Patent Application No. 10-2015-0041844 filed on Mar. 25, 2015, and all the benefits accruing therefrom under 35 U.S.C. § 119, the contents of which is incorporated by reference in its entirety.

BACKGROUND OF THE INVENTION

1. Field of the Invention

The present invention relates to a method of operating a screen baseball system, and more particularly to a method of operating a screen baseball system, capable of maximizing the profit of a shop by employing various game matches, popularizing the supply of a system by utilizing game information for a user training program and a character development program, and saving the manipulation time and the efforts of a user and an operator and the manufacturing cost by utilizing an application of a portable terminal.

2. Description of the Related Art

In general, a pitcher casts a ball, a catcher receives the ball, and a batter hits the ball to score a point in a baseball.

In the batting practice of a batter, if one person casts a ball, the batter may bat the ball. In addition, the batter may carry out the batting practice by batting a ball fling and coming using a baseball batting practice device to periodically shoot a baseball.

Further, if a user is a beginner, a woman, or a child, the user may bat a tee-ball fixed to a support positioned at a predetermined height by a bat.

As described above, since baseball requires some persons and a relatively large space, an ordinary person has limitations of human power, time, and a space in freely interesting the baseball.

In order to solve the problem, conventionally, batting cages have been provided with pitching machine. In the case of the batting cages, it is substantially impossible for a user to select a pitch type or cope with various conditions.

Further, since a game depending on batting progresses, reality and interesting are remarkably degraded in "strike", "out", or "scoring".

Meanwhile, recently, indoor golf driving ranges or screen golf driving ranges having maximized spatial utilization have been increased to allow a user to practice golf as one of indoor sports using a ball.

In the case of a typical screen golf system, a predetermined projection apparatus projects images on the front surface of a screen and reproduces the images, and a batter fixedly places a golf ball to a predetermined position and hits the golf ball into a virtual space projected onto the screen to progress a game.

However, in the case of golf, since only a hitter is required, and a ball to be hit is stopped, a game may progress or an image may be realized without a serious problem. On the other hand, in the case of baseball, a virtual ballpark must be formed, a pitcher and a batter are required, and a ball must be moved with reality along a predetermined trajectory according to pitching and batting. Accordingly, there is a limitation when a screen golf system is applied to baseball.

Further, in the case of baseball, factors to determine "strike" or "ball" are required, various offensive and defensive actions are optionally and dynamically made and a score is dynamically calculated. Accordingly, the baseball basically differs from the golf in game factors, so that the application of the screen golf system to the baseball is actually impossible.

As patent documents for prior arts, there are KR 10-2007-0110544 A and JP2005-204947 A.

SUMMARY OF THE INVENTION

An object of the present invention is to provide a method of operating a screen baseball system, capable of controlling a game match so that a user can play a game together with an opponent not only in the same region, but also in a geographically remote region in an individual unit or a team unit, and capable of storing an excellent batting image and the distribution of the batted ball in the game in a database to utilize the batting image and the distribution of the batted ball for a user training program and a character development program.

Another object of the present invention is to provide a method of operating a screen baseball system, capable of performing a registration procedure of a user using an application of a portable terminal, which is extensively used recently, capable of previously storing and utilizing pitches, which may not be adjusted every time as each shop employs a different revolution according to the distance between pitching machine and a batter box, in a predetermined memory device, and enabling a device control unit, which is provided at the center of the shop, to integrally monitor and control a plurality of screen baseball devices mounted in the shop.

Another object of the present invention is to provide a method of operating a screen baseball system, capable of minimizing the use of a camera sensor increasing cost in proportion to sensing power by dually employing units for precisely determining the trajectory of a batted ball and for removing a shadow part from the trajectory of a batted ball.

The objects of the present invention are not limited to the above-mentioned objects, and other objects will be clearly understood from the following description by those skilled in the art.

In order to accomplish the above objects, there is a method of operating a screen baseball system, which includes (a) registering a personal rank of a user by a game management unit, (b) displaying a pitching motion on a screen and starting a pitching action according to a selected pitch type, (c) performing a simulation along a trajectory of a batted ball, which is obtained by receiving and converting batting detection data of a batter among users, and displaying an image on the screen by the game management unit, (d) photographing a batting image of the batter and storing the batting image in a database by a game photographing unit such that the batting image is utilized for a user training program and a character development program, and (e) transmitting simulation information and batting image data, which are displayed, to a game shop, in which another user is positioned, in real time by a game server to play a game on line if the another user is positioned in a remote place. A device control unit monitors and controls steps (a) to (e) at a center.

In addition, the step (a) includes issuing a registration card having the personal rank and member subscription information of a user, and registering the personal rank through a reader to read the registration card.

Further, the step (a) includes inputting the personal rank and the member subscription information of the user using an application of a portable terminal, and registering the personal rank together with the application through a short-range communication function of the portable terminal.

Further, the step (b) includes selecting the pitch type through a keypad to prevent pitching information from leaking to an offense side.

In addition, the step (b) includes selecting the pitch type through a joystick to prevent pitching information from leaking to an offense side.

The step (b) includes previously storing an adjustment value for a specific pitch into an embedded memory device of a pitching machine section by considering that each shop has a different revolution of pitching machine and a different distance between the pitching machine and a batter box.

In addition, the step (c) includes detecting coordinate data of the batted ball as a plurality of front detection sensors are mounted at a position where a ballpark makes contact with an extension line of a base, and at a front or a rear of the position, detecting a strike ball, which fails to be batted, and a foul ball as a plurality of plane position sensors are positioned at left and right batter boxes and a catcher region, and removing a shadow part from the trajectory of the batted ball and detecting change of a movement direction of the batted ball at a batting point as a camera sensor is mounted in a home plate region.

The step (c) includes manually adjusting a defensive position according to at least one of a batter characteristic, a runner situation, and a score situation by a defense side.

The step (c) includes manually adjusting a runner motion according to at least one of a runner situation and a score situation by an offense side.

The step (c) includes freely adjusting an appearance of a pitcher depending on a distance between the screen and the batter box by the game management unit, and shielding light emitted from a rear surface of the screen with a blind, and coating a reflective material on a front surface of the screen.

The step (d) includes transmitting the photographed batting image to a screen driving unit and reproducing the photographed batting image on a screen.

The simulation information and the batting image data are transmitted through one of a wired communication network, a short-range communication network, and an Internet network in the step (e).

The step (e) includes inputting an available game schedule in an individual unit of a user or a team unit by the game server, and providing the available game schedule to another user in the remote place.

Details of other embodiments are included in the detailed description and accompanying drawings.

The advantages, the features, and schemes of achieving the advantages and features of the present invention will be apparently comprehended by those skilled in the art based on the embodiments, which are detailed later in detail, together with accompanying drawings. The present invention is not limited to the following embodiments but includes various applications and modifications. The embodiments will make the disclosure of the present invention complete, and allow those skilled in the art to completely comprehend the scope of the present invention. The present invention is only defined within the scope of accompanying claims.

As described above, according to the present invention, various game matches are possible without the difference in physical capabilities of between players or without temporal and spatial limitations, so that the profit of the shop can be maximized. The batting image in the game and the game information are utilized for the user training program and the character development program, thereby preventing users from avoiding a game match due to the physical superiority or inferiority of the users, so that the popularization of the supply of the system can be maximized.

In addition, the manipulation time and efforts of a user and an operator can be saved by utilizing an application of a portable terminal and a predetermined memory device, and the use of the camera sensor can be minimized to save the manufacturing cost, so that the productivity can be improved.

BRIEF DESCRIPTION OF THE DRAWINGS

FIG. 4 is a flowchart showing a part of a screen driving step in the method of operating the screen baseball system shown in FIG. 2.

DETAILED DESCRIPTION OF THE INVENTION

Hereinafter, an exemplary embodiment of the present invention will be described in detail with reference to accompanying drawings.

The terminology and words used herein and accompanying claims should be not interpreted as the meanings of commonly used dictionaries, but interpreted as having meanings according to the technical sprit of the present invention on the principle that the concepts of the terminology and the words can be defined by the inventor in order to explain the present invention in the best mode.

Throughout the whole specification, when a predetermined part "includes" a predetermined component, the predetermined part does not exclude other components, but may further include other components unless the context clearly indicates otherwise.

In addition, the terms "part", "machine", "module", "device", or "step" refer to units to process at least one function or operation, and is realized by hardware or software, or the combination of the hardware and the software.

In the following description, a portable terminal refers to a smart phone, a personal digital assistant (PDA), a portable multimedia player, or a smart pad which can be aided by a computer through Internet communication.

Figure 1:
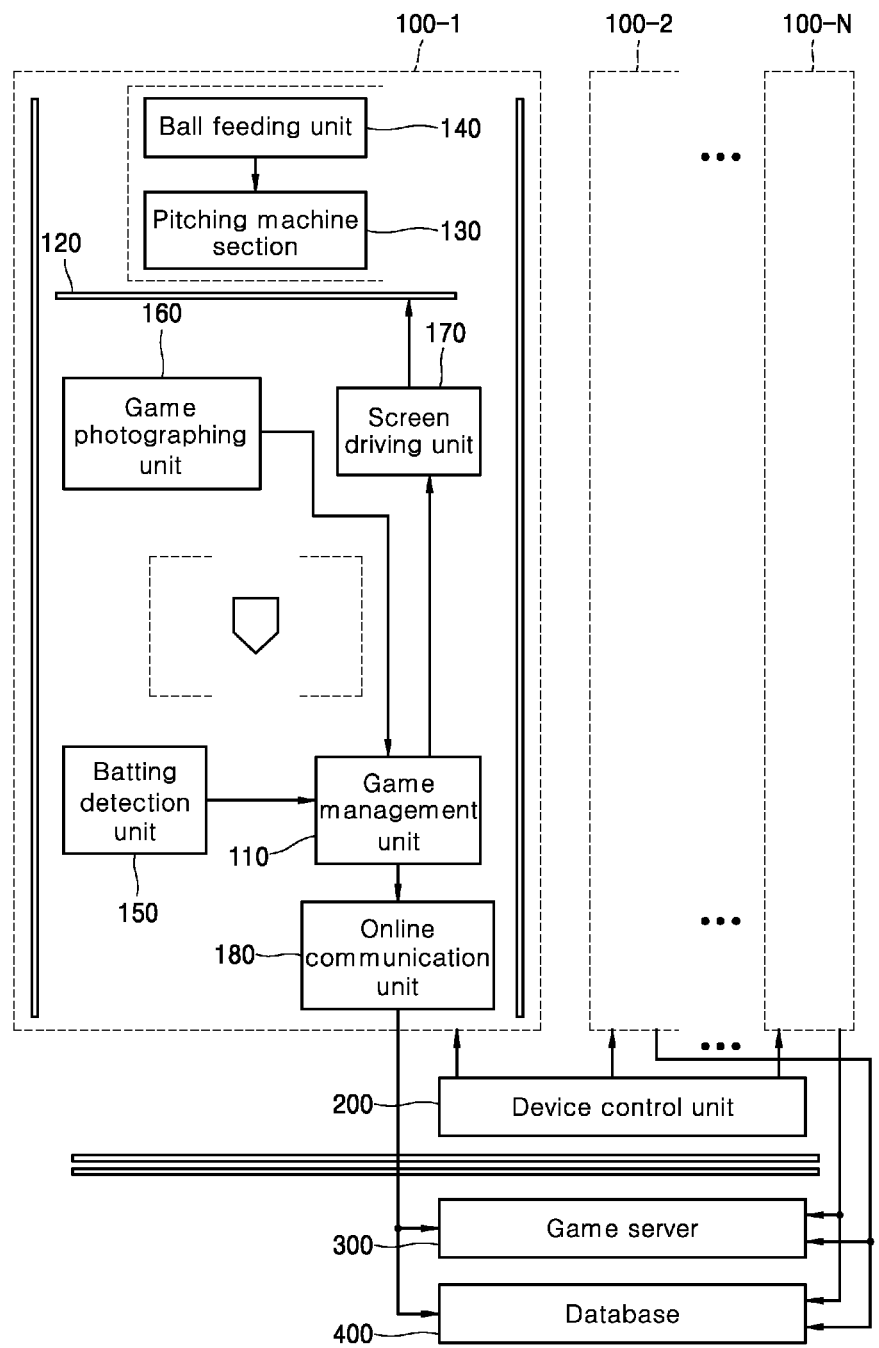
FIG. 1 is a schematic view showing a baseball system to realize a method of operating a screen baseball system according to the present invention.

FIG. 1 is a schematic view showing the structure of a baseball system to realize a method of operating a screen baseball system according to the present invention, and the baseball system includes a plurality of screen baseball devices 100-1 to 100-N, a device control unit 200, a game server 300, and a database 400.

Each of the screen baseball devices 100-1 to 100-N includes a game management unit 110, a screen 120, a pitching machine section 130, a ball feeding unit 140, a batting detection unit 150, a game photographing unit 160, a screen driving unit 170, and an online communication unit 180.

Hereinafter, the function of each component of the baseball system to realize the method of operating the screen baseball system according to the present invention will be described with reference to FIG. 1.

The game management unit 110 registers a personal rank of a user, performs a simulation along the trajectory of a batted ball, which is obtained by receiving and converting batting detection data, displays a game image on a screen 120 through the screen driving unit 170, and variously adjusts the appearance of a pitcher depending on the distance between the screen 120 and a batter box.

The pitching machine section 130 receives a ball from the ball feeding unit 140 and automatically or manually pitches the ball based on information on a pitch type selected by a user positioned at a defense side.

The batting detection unit 150 includes a plurality of front detection sensors, a plurality of plane position sensors, and a camera sensor to detect coordinate data of a batted ball, a strike ball which fails to be batted, and a foul ball, to remove a shaded part from the trajectory of the batted ball, and detects the change of a movement direction of the batted ball at a batting point.

The game photographing unit 160 photographs the batting image of the user and transmits the batting image of the user to a game management unit 110.

The screen driving unit 170 receives the batting image photographed by the game photographing unit 160 and a simulation image of the game management unit 110 and reproduces the batting image and the simulation image on the screen 120.

The online communication unit 180 transmits simulation information and batting image data displayed on the screen 120 to the game server 300 and the database 400.

The device control unit 200 integrally monitors and controls a plurality of screen baseball devices 100-1 to 100-N.

The game server 300 transmits the simulation information and the batting image data displayed on the screen 120 to another user positioned at a remote place in real time so that a baseball game progresses on line.

The database 400 receives a batting image and game information data from the online communication unit 180 and stores the batting image and the game information data therein so that the batting image and the game information are utilized for a user training program and a character development program.

Figure 2:
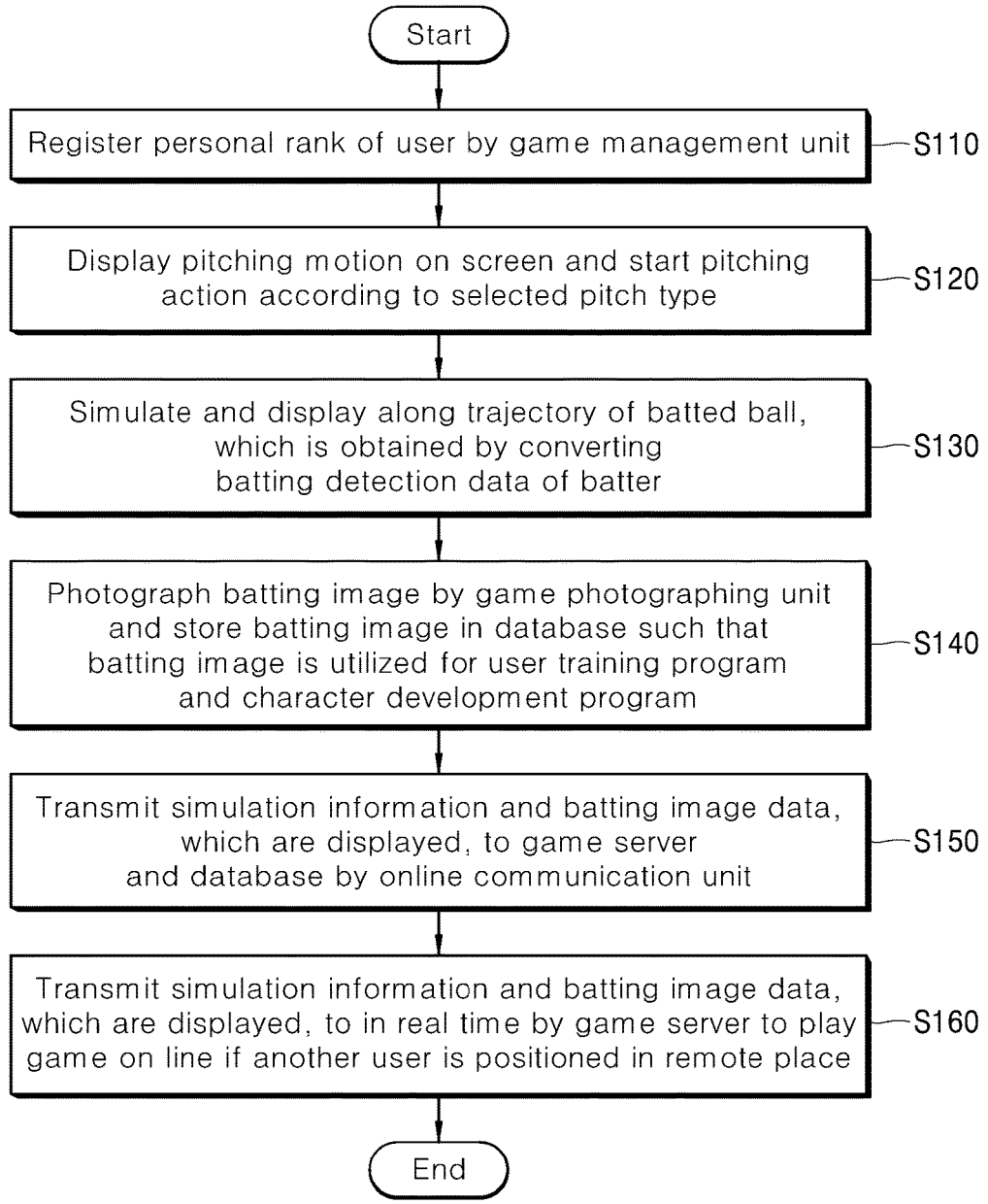
FIG. 2 is a flowchart showing an overall operation of the method of operating the screen baseball system according to the present invention.

FIG. 2 is a flowchart showing the overall operation of the method of operating the screen baseball system according to the present invention.

Hereinafter, the overall operation of the method of operating the screen baseball system according to the present invention will be described with reference to FIGS. 1 and 2.

The game management unit 110 registers the personal rank of the user and opens a game (S110).

If the batter is at bat, the game management unit 110 checks the personal rank of the batter based on registered user information, and, if a user positioned at a defense side takes a basic defense operation, for example, selects a pitch type, the information of the pitch is transmitted to the pitching machine section 130.

If the batter presses a pitch pedal provided in a batter box, a batting action is displayed on the screen 120, and a pitching action is started according to the selected pitch type (S120).

If the batter bats a ball, the information of the batting action is transmitted from the batting detection unit 150 to the game management unit 110, and the information of the batting action is analyzed as the trajectory of an arch. The game simulation is performed based on the analysis, and the game image is displayed on the screen 120 (S130).

In this case, the game photographing unit 160, which is mounted on an upper portion of a left wall or a right wall in front of the batter, photographs the batting action of the batter, and transmits the batting image to the game management unit 110, so that the batting image is transmitted to the game server 300 and the database 400 through the online communication unit 180.

The database 400 receives the batting image and the game information data from the game management unit 110 and stores the batting image and the game information data therein so that the batting image and the game information are utilized for the user training program and the character development program.

Meanwhile, if an opponent of a game is another user positioned in a remote place, the game server 300 transmits the simulation information and the batting image, which are displayed, to a game shop, in which the opponent is positioned, in real time so that the game may be played on line (S150).

For example, when a plurality of users want make a team in a shop C and play a game together with another team, and a desirable opposite team is located at another shop D, the game server 300 displays simulation information and batting image data, which are displayed in the shop C, on a monitor or screen of the game management unit 110 in the shop D as if both teams play a game in one place.

Hereinafter, a game management step and a control step in a screen baseball system according to the present invention will be described with reference to FIGS. 1 and 2.

Operation of Game Management Unit

The game management unit 110 is provided in the form of a personal computer (PC) and located adjacent to the batter box, and includes a keyboard, a mouse, a monitor, or a touch screen.

The game management unit 110 registers users first to be at bat according teams. In this case, the game management unit 110 registers the users in such a manner that personal ranks of the users are applied to and reflected on the game.

In order to simplify user registration, additional registration cards (a bar code or an RF card) having the personal rank and the member subscription information of the user may be issued and a relevant reader may be mounted as an input device.

In addition, as the portable terminal is extensively used, the personal rank and the member subscription information of the user are input through an application of the portable terminal, and the application is executed through a short-range communication function of the portable terminal so that the personal rank of the user may be registered.

The game management unit 110 allows a defense team to select a pitch type of a ball to be pitched by the pitching machine section 130.

In this case, in order to prevent pitching information from leaking to an offense side, an additional input device provided in the form of a keypad may be equipped.

The keypad includes a button set including a small number of buttons, and includes a game manipulation device such as a joystick.

Generally, in a baseball game, a defensive position can be dynamically changed according to a batter characteristic, a runner situation, and a score situation. The game management unit 110 allows the selection of the defensive position through a basic input device or an additional keypad.

The offense side changes the motion of a runner (run-and-hit, or hit-and-run) according to the runner situation and the score situation, which serves as an important factor to increase the game participation of the user. Accordingly, the game management unit 110 may set the motion of the runner through the basic input device and an additional input device.

The batting data detected by the batting detection unit 150 are changed to the trajectory of the ball, and the game is simulated so that the defending procedure is automatically performed along the trajectory of the ball and the game situation.

Baseball is called a record game since each game element has an important meaning. Accordingly, the information of a present game becomes important basic information when a next game is played.

Accordingly, the information of the present game is subject to a predetermined process for storage in the database 400 to be described.

In addition, the communication scheme is not limited to a wired scheme, but includes the processing scheme through an application based on a short-range communication network in a smart phone.

Operation of Game Server and Database

The game server 300 allows the game record (winning percentage and batting average) of an individual and a relevant team.

In addition, users may play a game not only in one region, but also in mutually different regions by sharing the information of players and a game simulation in real time on line between regions geographically spaced apart from each other.

In addition, the game server 300 inputs an available game schedule in an individual unit or a team unit, or allows a user to check the available game schedule of another person. Accordingly, the game server 300 controls a game match so that the user may search for a ballpark together with an opponent to play a game, and may easily find an opponent to play a game even if there is no opponent.

Accordingly, more conveniently, a user may play a game together with an opponent in one place, and play an online game together with an opponent in a different place.

Meanwhile, if the superiority or the inferiority of a player is determined based on a physical advantage or a physical disadvantage, the player is avoided as an opponent. Accordingly, in order to overcome this, the game server 300 constructs a user training program and a character development program to be reflected on the game simulation.

The above function is not provided for a user through a specific input/output device. In other words, only if the user basically accesses the Internet, the above function may be provided in various forms such as a web browser or an application.

Figure 3:
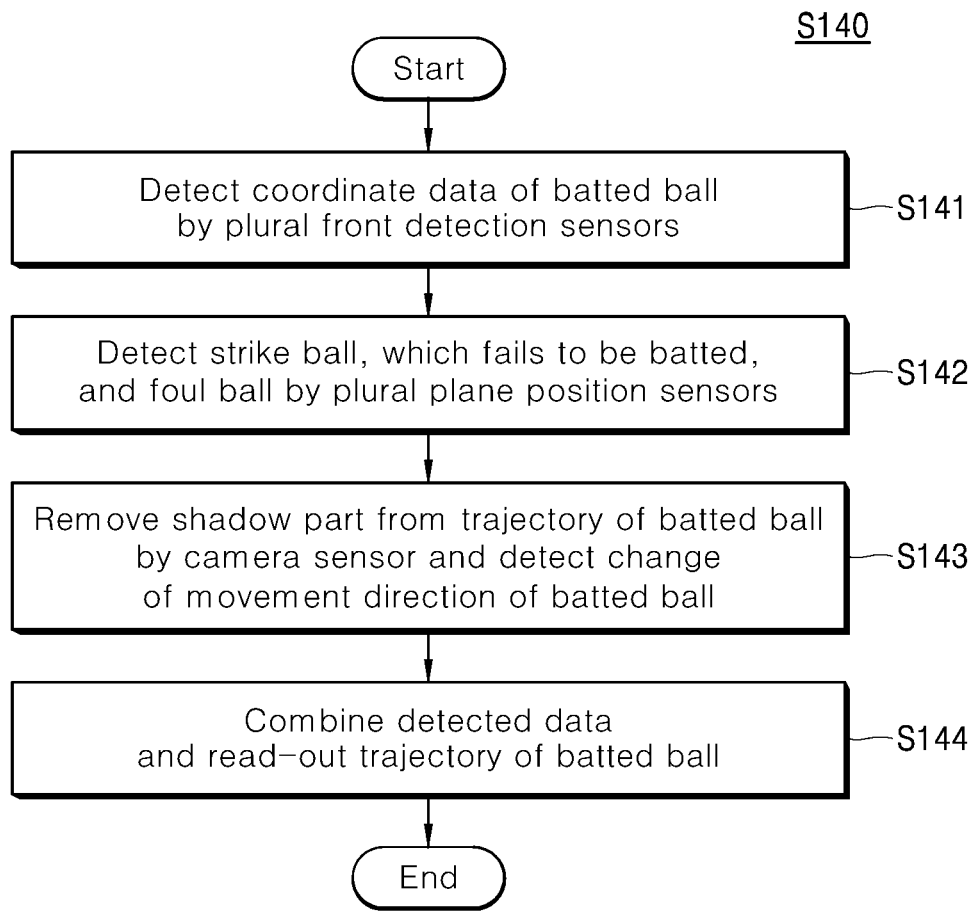
FIG. 3 is a flowchart showing a part of a batting detection step in the method of operating the screen baseball system shown in FIG. 2.

FIG. 3 is a flowchart showing a part of a step (S130) of detecting batting in the method of operating the screen baseball system shown in FIG. 2.

FIG. 4 is a flowchart showing a part of a step (S150) of driving a screen in the method of operating the screen baseball system shown in FIG. 2.

Hereinafter, the step of operating a device in the method of operating the screen baseball system according to the present invention will be described with reference to FIGS. 1 to 4.

Operation in Pitching Step

If the game management unit 110 transmits the personal rank and the pitching information of the user to the pitching machine section 130, the pitching machine section 130 adjusts a pitch type and a posture of a pitcher based on the selected pitch type and starts pitching.

The manual manipulation allows the management of a shop as the device control unit 200 integrally monitors and controls a plurality of pitching machine.

The pitching machine is provided in the form of three wheels, and a ball is pushed as the three wheels A, B, and C are rotated forward. According to the rotational speeds of the three wheels A, B, and C, the pitches of the ball, such as a fastball, a forkball, or a curveball are determined.

In an actual operation in a shop, the revolutions of the pitching machine are varied depending on the distance between the pitching machine and the batter box. Accordingly, it is significantly difficult to individually adjust the revolutions every time according to pitches. Therefore, preferably, the pitching machine section 130 previously stores an adjustment value for a specific pitch in an embedded memory device (for example, EPROM, or RAM), and uses the adjustment value.

Operation in Batting Detecting Step

The trajectory of the batted ball is detected (S144) through combination of data detected using a plurality of front detection sensor capable of detecting data of horizontal and vertical coordinates of the batted ball (S141) and a plurality of plane position sensors capable of distinguishing a strike ball which fails to be batted, and a batted ball (foul ball) which does not pass through the front detection sensors (S142).

In this case, the front detection sensors (not shown) are mounted at a position where the ballpark makes contact with an extension line of a base, and at front or rear of the position. The plane position sensors (not shown) are provided at left and right batter boxes and a catcher region to remove error data occurring in bat recognition, and to distinguish the trajectory of the foul ball bounced from a wall, a floor, or a ceil and the trajectory of a hit ball.

Meanwhile, a camera sensor (not shown) mounted at a home plate region, where the batting point may be observed, removes a shadow part from the trajectory of the batted ball, and detects the change of the movement direction of the ball at the batting point to distinguish a rear foul tip (S143).

As described above, the front detection sensors and the plane position sensors are in charge of precisely determining the trajectory of the batted ball, and the camera sensor removes the shadow part from the trajectory of the batted ball. Accordingly, the use of the camera sensor exponentially increasing cost in proportion to the sensing power thereof is minimized.

Operation in Screen Driving Step

Images similar to those of an actually broadcasted baseball game are displayed on the screen 120 mounted at the front of the pitching machine through the projector (not shown) mounted at the rear of the batter box (S151). In addition, the information (for example, information of a batter and the information of batting) required for the progressing of the game is displayed (S152) through a monitor mounted in a batter waiting room.

The projector may be positioned at a proper distance (for example, 8 m) from the front of the screen 120 depending on the distance between the pitching machine and the batter box. In addition, an auxiliary projector (not shown) may be additionally mounted in order to widen a viewing angle of the batter by displaying surrounding images that are not viewed on the screen 120 (S153).

The game management unit 110 freely adjusts the appearance of the pitcher depending on the distance between the screen 120 and the batter box so that the pitching motion of the pitcher is shown with reality (S154), more clearly displays an image by shielding light emitted from a rear surface of the screen 120 with a blind (S155), and displays a lighter image by coating a reflective material on a front surface of the screen (S156).

Operation in Game Photographing Step

The camera mounted on the upper portion of the left wall or the right wall in front of the batter photographs a batting image of the batter to transmit the image to the game management unit 110 (S161). In this case, the photographed batting image is transmitted to the screen driving unit 170 and reproduced on the screen (S162).

In addition, a specific image material, such as a good-quality hitting image, among the photographed batting images is temporarily stored, transmitted and stored in the database 400. Thereafter, the specific image material may be utilized for the user training program and the character development program (S163).

For example, a user who wants to check a batting posture of the user to more improve a game capability may refer to the specific image material such as the hitting image on line through various schemes including the user training program, and may refer to the specific image material by displaying the specific image material on the screen.

In addition, the user may easily check advantages and disadvantages of the batting posture of the user by using the ball distribution obtained from the batting image and the game information.

Further, a user who wants a personal lesson to correct or complement the batting posture of the user is directly connected with an ex-player or a current player through the introduction of a shop by the character development program in order to receive the personal lesson from the ex-payer or the current player, thereby preventing users from avoiding a game match due to the physical superiority or the inferiority thereof.

As described above, according to the method of operating the screen baseball system according to the present invention, various game matches are possible without the difference in physical capabilities of between players or without temporal and spatial limitations, so that the profit of the shop can be maximized. In addition, the users can be prevented from avoiding a game match due to their physical superiority or the inferiority through the user training program and the character development program based on the batting images in the game and the game information, so that the popularization of the supply of the system can be maximized.

In addition, the manipulation time and efforts of a user and an operator can be saved by utilizing an application of a portable terminal and a predetermined memory device, and the use of the camera sensor can be minimized to save the manufacturing cost so that the productivity can be improved.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A method of operating a screen baseball system, the method comprising:
    (a) registering a personal rank of a user by a computer;
    (b) displaying a pitching motion on a screen and starting a pitching action according to a selected pitch type;
    (c) performing a simulation along a trajectory of a batted ball, which is obtained by receiving and converting batting detection data of a batter among users, and displaying an image on the screen by the computer;
    (d) photographing a batting image of the batter and storing the batting image in a database by a camera such that the batting image is utilized for a user training program and a character development program; and
    (e) transmitting simulation information and batting image data, which are displayed, to a game shop, in which another user is positioned, in real time by a game server to play a game on line if the another user is positioned in a remote place,
    wherein the method includes monitoring and controlling steps (a) to (e), and the step (b) comprises previously storing an adjustment value for a specific pitch into an embedded memory device of a pitching machine section by considering that each shop has a different revolution of pitching machine and a different distance between the pitching machine and a batter box.

2. The method of claim 1, wherein the step (a) comprises:
    issuing a registration card having the personal rank and member subscription information of a user; and
    registering the personal rank through a reader to read the registration card.

3. The method of claim 1, wherein the step (a) comprises:
    inputting the personal rank and member subscription information of the user using an application of a portable terminal; and
    registering the personal rank together with the application through a short-range communication function of the portable terminal.

4. The method of claim 1, wherein the step (b) comprises selecting the pitch type through a keypad to prevent pitching information from leaking to an offense side.

5. The method of claim 1, wherein the step (b) comprises selecting the pitch type through a joystick to prevent pitching information from leaking to an offense side.

6. The method of claim 1, wherein the step (c) comprises:
    detecting coordinate data of the batted ball as a plurality of front detection sensors are mounted at a position where a ballpark makes contact with an extension line of a base, and at a front or a rear of the position; and
    detecting a strike ball, which fails to be batted, and a foul ball as a plurality of plane position sensors are positioned at left and right batter boxes and a catcher region.

7. The method of claim 1, wherein the step (c) comprises manually adjusting a defensive position according to at least one of a batter characteristic, a runner situation, and a score situation by a defense side.

8. The method of claim 1, wherein the step (c) comprises manually adjusting a runner motion according to at least one of a runner situation and a score situation by an offense side.

9. The method of claim 1, wherein the step (c) comprises:
    freely adjusting an appearance of a pitcher depending on a distance between the screen and the batter box by the computer; and
    shielding light emitted from a rear surface of the screen with a blind, and coating a reflective material on a front surface of the screen.

10. The method of claim 1, wherein the step (d) comprises transmitting the photographed batting image and reproducing the photographed batting image on a screen.

11. The method of claim 1, wherein the simulation information and batting image data are transmitted through one of a wired communication network, a short-range communication network, and an Internet network.

12. The method of claim 1, wherein the step (e) comprises:

inputting an available game schedule in an individual unit of a user or a team unit by the game server; and providing the available game schedule to the another user in the remote place.

13. The method of claim 1, wherein the step (c) comprises: removing a shadow part from the trajectory of the batted ball and detecting change of a movement direction of the batted ball at a batting point as a camera sensor is mounted in a home plate region.

14. The method of claim 1, wherein the step (d) comprises reproducing the photographed batting image on a screen.

15. A method of operating a screen baseball system, the method comprising:

(a) registering a personal rank of a user by a computer;

(b) displaying a pitching motion on a screen and starting a pitching action according to a selected pitch type;

(c) performing a simulation along a trajectory of a batted ball, which is obtained by receiving and converting batting detection data of a batter among users, and displaying an image on the screen by the computer;

(d) photographing a batting image of the batter and storing the batting image in a database by a camera such that the batting image is utilized for a user training program and a character development program; and (e) transmitting simulation information and batting image data, which are displayed, to a game shop, in which another user is positioned, in real time by a game server to play a game on line if the another user is positioned in a remote place, wherein the method includes monitoring and controlling steps (a) to (e), and wherein the step (c) comprises: freely adjusting an appearance of a pitcher depending on a distance between the screen and a batter box by the computer; and shielding light emitted from a rear surface of the screen with a blind, and coating a reflective material on a front surface of the screen.

16. A method of operating a screen baseball system, the method comprising:

(a) registering a personal rank of a user by a computer;

(b) displaying a pitching motion on a screen and starting a pitching action according to a selected pitch type;

(c) performing a simulation along a trajectory of a batted ball, which is obtained by receiving and converting batting detection data of a batter among users, and displaying an image on the screen by the computer;

(d) photographing a batting image of the batter and storing the batting image in a database by a camera such that the batting image is utilized for a user training program and a character development program; and (e) transmitting simulation information and batting image data, which are displayed, to a game shop, in which another user is positioned, in real time by a game server to play a game on line if the another user is positioned in a remote place, wherein the method includes monitoring and controlling steps (a) to (e), and wherein the step (c) comprises: removing a shadow part from the trajectory of the batted ball and detecting change of a movement direction of the batted ball at a batting point as a camera sensor is mounted in a home plate region.

* * * * *